US012609058B2

(12) United States Patent
Moyes

(10) Patent No.: US 12,609,058 B2
(45) Date of Patent: Apr. 21, 2026

(54) ANIMATED PERFORATED IMAGES

(71) Applicant: METRIX GROUP PTY LTD, Victoria (AU)

(72) Inventor: Phil Moyes, Victoria (AU)

(73) Assignee: METRIX GROUP PTY LTD (AU)

( * ) Notice: Subject to any disclaimer, the term of this patent is extended or adjusted under 35 U.S.C. 154(b) by 166 days.

(21) Appl. No.: 18/715,795

(22) PCT Filed: Jan. 11, 2023

(86) PCT No.: PCT/AU2023/050011
§ 371 (c)(1),
(2) Date: Jun. 3, 2024

(87) PCT Pub. No.: WO2023/137514
PCT Pub. Date: Jul. 27, 2023

(65) Prior Publication Data

US 2025/0037618 A1 Jan. 30, 2025

(30) Foreign Application Priority Data

Jan. 21, 2022 (AU) ................................ 2022900114

(51) Int. Cl.
*G09F 19/14* (2006.01)
*B42D 1/00* (2006.01)

(52) U.S. Cl.
CPC ............ *G09F 19/14* (2013.01); *B42D 1/004* (2013.01)

(58) Field of Classification Search
CPC ......... G09F 19/14; G03B 25/02; G03B 35/24; H04N 13/31; H04N 13/351
See application file for complete search history.

(56) References Cited

U.S. PATENT DOCUMENTS 1,474,572 A * 11/1923 Whitstock .............. A63H 33/22 446/151
2,307,276 A * 1/1943 Keyzer .................. G03B 35/24 359/466

(Continued)

FOREIGN PATENT DOCUMENTS

WO 2012144453 A1 10/2012

OTHER PUBLICATIONS

International Search Report issued in PCT/AU2023/050011.

*Primary Examiner* — Gary C Hoge
(74) *Attorney, Agent, or Firm* — The Belles Group, P.C.

(57) ABSTRACT

A structure for depicting a plurality of images has a lower perforated screen having the plurality of images. A first image is formed from first perforations arranged in a series of first image lines. A second image is formed from second perforations arranged in a series of second image lines. An upper defining screen is arranged substantially co-planarly over the lower perforated screen. A width of defining apertures in the upper defining screen is about the width of the first image lines and the second image lines so that from any viewing perspective the first image or the second image can be isolated for viewing. The first image is viewable from a first viewing location and the second image is viewable from a second viewing location so that repeated movement of an observer between the first and second viewing locations allows the plurality of images to appear to be animated.

11 Claims, 9 Drawing Sheets

(56) References Cited

U.S. PATENT DOCUMENTS

| | | | | |
|---|---|---|---|---|
| 5,901,484 | A * | 5/1999 | Seder | G09F 11/00<br>40/445 |
| 6,286,873 | B1 * | 9/2001 | Seder | G09F 19/14<br>40/433 |
| 8,044,881 | B2 * | 10/2011 | Nam | G09G 3/3406<br>345/32 |
| 2013/0155034 | A1 | 6/2013 | Nakayama et al. | |
| 2015/0319427 | A1 * | 11/2015 | Wu | H04N 13/315<br>345/426 |
| 2016/0182899 | A1 * | 6/2016 | Liu | H04N 13/31<br>348/54 |
| 2019/0155044 | A1 * | 5/2019 | Gao | G02B 30/40 |
| 2020/0183182 | A1 * | 6/2020 | Yang | G02F 1/292 |
| 2020/0218079 | A1 * | 7/2020 | Liao | G02B 30/27 |
| 2021/0165242 | A1 * | 6/2021 | Kusafuka | G02B 27/0093 |
| 2022/0260900 | A1 * | 8/2022 | Brandes-Krug | G03B 25/02 |
| 2024/0064282 | A1 * | 2/2024 | Kusafuka | H04N 13/398 |
| 2024/0089422 | A1 * | 3/2024 | Kusafuka | H04N 13/376 |

* cited by examiner

ANIMATED PERFORATED IMAGES

This application claims priority to AU 2022900114 entitled Animated Perforated Images filed 21 Jan. 2022, the contents of which are hereby incorporated in their entirety.

TECHNICAL FIELD

The present invention relates to structures used to create images using individual features provided on the structure as a proxy for pixels of the image. In an embodiment, the images appear to be animated depending upon the viewers perspective.

BACKGROUND

Picture perforating is an idea whereby images are rendered using a series of holes formed in e.g. a metal substrate. When light passes through the holes of various sizes, relatively darker and relatively lighter areas form an image similar to the way in which images are formed in large scale newsprint. One of the early examples of the use of picture perforating was undertaken at the de Young Museum San Francisco, developed by the architect Herzog & de Meuron in conjunction with A. Zahner Company. Picture perforating is now a widely utilised method for providing images and installations can be created by many companies all over the world.

The illusion of movement through the substitution of images has been achieved through various means prior to the invention of film cinematography. The phenakisticope utilised a cardboard disc with a series of images which when viewed through a series of corresponding slots and via a mirror created an illusion of movement (viewing through the slots isolated each image from the next). The Zeotrope worked by a similar method but was constructed in the form of a cylinder with a series of viewing slots and with the images around the inside of the device.

The present invention builds upon past techniques of image creation utilising an innovative technique to achieve image isolation and in embodiments a perception of movement when viewed.

SUMMARY OF INVENTION

According to a first aspect of the present invention there is provided structure for depicting a plurality of images, the structure comprising:

- a lower perforated screen comprising the plurality of images, the plurality of images comprising at least a first image and a second image, wherein:
  - the first image is formed from first perforations arranged in a series of first image lines, the first perforations in each first image line allowing passage of an amount of light that represents an individual pixel or group of pixels of the first image so that the overall effect when viewing only the first image lines is formation of the first image,
  - the second image is formed from second perforations arranged in a series of second image lines, the second perforations in each second image line allowing passage of an amount of light that represents an individual pixel or group of pixels of the second image so that the overall effect when viewing only the second image lines is formation of the second image,

- the first image lines and second image lines arranged across the lower perforated screen from one side to another side in an alternating pattern,
- an upper defining screen arranged substantially co-planarly over the lower perforated screen and spaced therefrom, the upper defining screen comprising a series of defining apertures arranged across the upper defining screen from one side to another side,
- wherein the width of each defining aperture in the upper defining screen is about the width of the first image lines and the second image lines so that from any one viewing perspective the first image or the second image can be isolated for viewing, and the first image is viewable from a first viewing location and the second image is viewable from a second viewing location so that repeated movement of an observer between the first viewing location and the second viewing location allows the plurality of images to appear to the user to be animated.

When the observer is standing in front of the structure, the light that strikes the observer's eye will be light that can pass (from back to front) through the perforations and apertures in the lower perforated screen and the upper defining screen respectively. Accordingly, the lower perforated screen is typically spaced from any back mounting wall to allow passage of light from behind. A natural light source can be used. An artificial light source can be used. Some of the light passing through the lower perforated screen will be blocked by the upper defining screen and will not reach the observer's eye. By spacing the upper defining screen from the lower perforated screen, as the observer moves relative to the structure different perforations (in the lower screen) will align with the apertures (in the upper screen) creating a continuously different visual effect for the observer. If the underlying images are similar to one another, but slightly offset in their configurations, the resultant visual effect will be the illusion that the image being observed is animated e.g. moving through a repeated cycle.

The present structure is advantageously for depicting a plurality of images. The images can take any form and may include symbols including letters and numbers, shapes including those making up a recognisable item (such as an eye or an animal) or shapes forming a repeating pattern. The substrate from which the images are formed can be made from any material including metal, wood, plastic or other. In a preferred embodiment, the lower perforated screen substrate is formed form a material in which perforations can be readily formed. In a preferred embodiment, the upper defining screen substrate is formed form a material in which apertures can be readily formed. In a preferred embodiment, the lower and upper screens of the structure are formed from a metal a substrate. The metal substrate can be a panel. Once panel can be used alongside other panels to form an overall larger image. The panels can be joinable to one another along their edges by any connecting means. In an embodiment, the panel is at least about 1 or 2 m in its longest dimension.

The substrate is preferably flat or planar. However, in embodiments, the substrate can be undulating or curved. If the substrate is not planar, this may need to be taken into account when the image is formed on the substrate, since the light might change as it passes through perforations/aperture features in different planes. A curved lower perforated screen may have a constant distance from the upper defining screen that is complementary in shape and substantially co-planar across all undulations.

The lower perforated screen is configured to provide the observer with the ability to view a plurality of images subject to where they are located relative to the structure. There is provided at least a first image and a second image. In an embodiment, there are N images where N is an even number. In an embodiment, where there is a first image and a second image, N=2. N can also equal 3, 4, 5, 6, 7, 8, 9 or 10. There can be any number of images formed in the lower perforated screen. However, as the number of images increases, it becomes increasingly difficult to create a cyclical animated effect because the image will simply keep changing. In a preferred embodiment there are 2 or 4 images.

If the first image was to be viewed alone, the first image could simply be a series of perforations formed in a screen which when viewed together would give the effect of an image. As light travels through the perforations, the size of each perforation permits passage of relative amount of light. A small perforation allows passage of less light than a relatively larger perforation. Accordingly, the size of a perforation can be used as a proxy for a pixel. In order to provide better resolution for each pixel, the structure can be backlit by providing a light source that increases the amount of light passing through the structure.

The perforations can be of any shape. The perforations can be slots. The perforations can be circular. In some embodiments, changing the shape or changing the size of the shape can change the amount of light that passes through. In an embodiment, the length of a slotted perforation can be altered to change the amount of light that passes through an area of the lower screen. A long slot will allow passage of more light than a relatively short slot. In an embodiment, the diameter of a circular perforation can be altered to change the amount of light that passes through an area of the lower screen. A large diameter will allow passage of more light than a relatively smaller diameter.

In some embodiments, the pixel proxy can be by providing perforations of the same size, but there can be more of them grouped more densely adjacent to one another to permit passage of more light. For example, a large number of small circular apertures will allow more light to pass through than one or two of the same sized apertures. A computer software program can be used to take an image and covert it to the equivalent perforation template that can be etched or cut into a substrate automatically.

If the second image was to be viewed alone, the second image could simply be a series of perforations formed in a screen which when viewed together would give the effect of an image. When a first image and a second image are to be viewed from the same substrate, each of the images can be sectioned into slices. Each slice can comprise lines of that image. The first image can be formed from first image lines. The second image can be formed from second image lines.

In the present invention, the first image is formed from first perforations which are arranged in a series of first image lines. The first perforations in each first image line allow passage of an amount of light that represents an individual pixel or group of pixels of the first image so that the overall effect when viewing only the first image lines is formation of the first image. The first perforations in each first image line can comprise a series of single perforations arranged in a line. Alternatively, the first perforations can be groups of perforations arranged together but bounded by first image boundary lines. The width of the first image lines can be about 3, 4, 5 or 6 mm.

In the present invention, the second image is formed from second perforations which are arranged in a series of second image lines. The second perforations in each second image line allow passage of an amount of light that represents an individual pixel or group of pixels of the second image so that the overall effect when viewing only the second image lines is formation of the second image. The second perforations in each second image line can comprise a series of single perforations arranged in a line. Alternatively, the second perforations can be groups of perforations arranged together but bounded by second image boundary lines which can abut the first image boundary lines. The width of the second image lines can be about 3, 4, 5 or 6 mm.

In an embodiment, there are third image lines and fourth image lines, and so on, subject to how many images are provided. Where there is more than one image, the width of the image lines is a constant width across the lower screen.

The lower perforated screen can have a top edge, a bottom edge, a left-side edge and a right-side edge. The first image lines and second image lines are arranged across the lower perforated screen from one side to another side. The first image lines and second image lines can be arranged across the lower perforated screen from the top edge to the bottom edge. The first image lines and second image lines can be arranged across the lower perforated screen from the left-side edge to the right-side edge.

The first image lines (A) and second image lines (B) are arranged across the lower perforated screen in an alternating pattern. Where there are two images, the alternating pattern can A, B, A, B, A, B . . . and so on. Where there are first image lines (A), second image lines (B), third image lines (C) and fourth image lines (D), the lines can alternate with one another in a pattern such as A, B, C, D, A, B, C, D, A, B, C, D . . . . However, other patterns might also be effective such as A, B, A, B, C, D, A, B, A, B, C, D . . . . Any variation in pattern can be used and the skilled person is free to experiment with patterns either by electronic simulation or by making the structures in order to achieve a desired visual effect.

Where there are multiple images, the desired visual effect is achievable by means of the upper defining screen. The upper defining screen is important because it is how the observer is able to see only one of the images (e.g. first image) while the other image(s) (e.g. second image) is/are occluded from view. Essentially, the upper defining screen defines which perforations (pixels) of the lower perforated screen are visible to the observer. The upper defining screen allows passage of light in strips or lines that correspond or complement the image lines. To do this, the upper defining screen has a series of occluding plates or closed areas that do not allow passage of light. Between each closed light-blocking area there are a series of defining apertures arranged from one side to another side. The apertures, rather than being pixel forming like the perforations, are viewing apertures which comprise open space to allow light from the perforations to pass through mostly unhindered into the observer's eye.

The upper defining screen can have a top edge, a bottom edge, a left-side edge and a right-side edge. The defining apertures are arranged across the upper defining screen from one side to another side. If the first image lines and second image lines are arranged across the lower perforated screen from the top edge to the bottom edge; the defining apertures can be arranged across the upper defining screen from the top edge to the bottom edge. The observer will then see the images by moving upwardly and downwardly relative the structure. This could be useful where the observer is e.g. moving up and down a stair case and the structure is arranged near the stair case.

If the first image lines and second image lines are arranged across the lower perforated screen from the from the left-side edge to the right-side edge; the defining apertures can be arranged across the upper defining screen from the left-side edge to the right-side edge. The observer will then see the images by moving sideways relative the structure. This could be useful where the observer is e.g. moving along a hallway or room and the structure is arranged in the room.

The upper defining screen is arranged substantially coplanarly over the lower perforated screen and is spaced therefrom. The spacing can be by means of spacers inserted between the lower and upper screen. The spacers can be metal struts. Preferably, the metal struts do not affect viewing of the image. Accordingly, in one embodiment, the spacers are at the outer peripheral edge of the screens. In an embodiment, the spacers can be adjustable, so that when first installed, the spacing can be changed according to the possible viewing locations of the observer. The adjustable spacers can be adjusted e.g. by means of a telescopic of screw threaded shaft that can be manually adjusted and then fixed into a position.

The distance of the upper defining screen from the lower perforated screen will change what the observer is able to see. If the upper defining screen is too close to the lower perforated screen, the observer will not get full resolution of the plurality of images. If the upper defining screen is spaced too far from the lower perforated screen, the observer will not be able to resolve only one image to the exclusion of the other(s). Accordingly, the spacing of the upper defining apertures is related to the width of each of the image lines, and the distance between the upper and lower screens and the viewing distance. This is calculatable based on the teachings herein, or derivable by trial and error based on the teachings herein.

Advantageously, the width of each defining aperture in the upper defining screen is about the width of the first image lines and the second image lines so that from any one viewing perspective the first image or the second image can be isolated for viewing. If the width of the first image lines is about N mm, the width of the defining apertures can be about N mm.

Once the structure is place, the first image is viewable from a first viewing location. While there is not a single first viewing location, but a multitude of first viewing locations at which the first image is resolvable without the second image. The second image is viewable from a second viewing location. There is not a single second viewing location, but a multitude of second viewing locations at which the second image is resolvable without the first image. All first viewing locations must be different from all the second viewing locations. In use, the observer moves from a first viewing location to a second viewing location, either by moving his whole body or just his head (eyes). As the observer moves, the image changes between the first image and second image. The image is likely to change repeatably because of the cycling through first and second viewing locations. Thus, the plurality of images provides the illusion to the observer that they are animated because the images change.

BRIEF DESCRIPTION OF THE FIGURES

Embodiments of the invention will now be described with reference to the accompanying drawings which are not drawn to scale and which are exemplary only and in which.

DETAILED DESCRIPTION OF EMBODIMENTS OF THE INVENTION

FIG. 1 shows an embodiment of a structure 10 in which there are 4 images (image 1, Image 2, Image 3, Image 4). When the observer (not shown) is standing in front of the structure 10, light will strike the observer's eye and he will be able to see only one of the images at any one viewing location.

Figure 3:
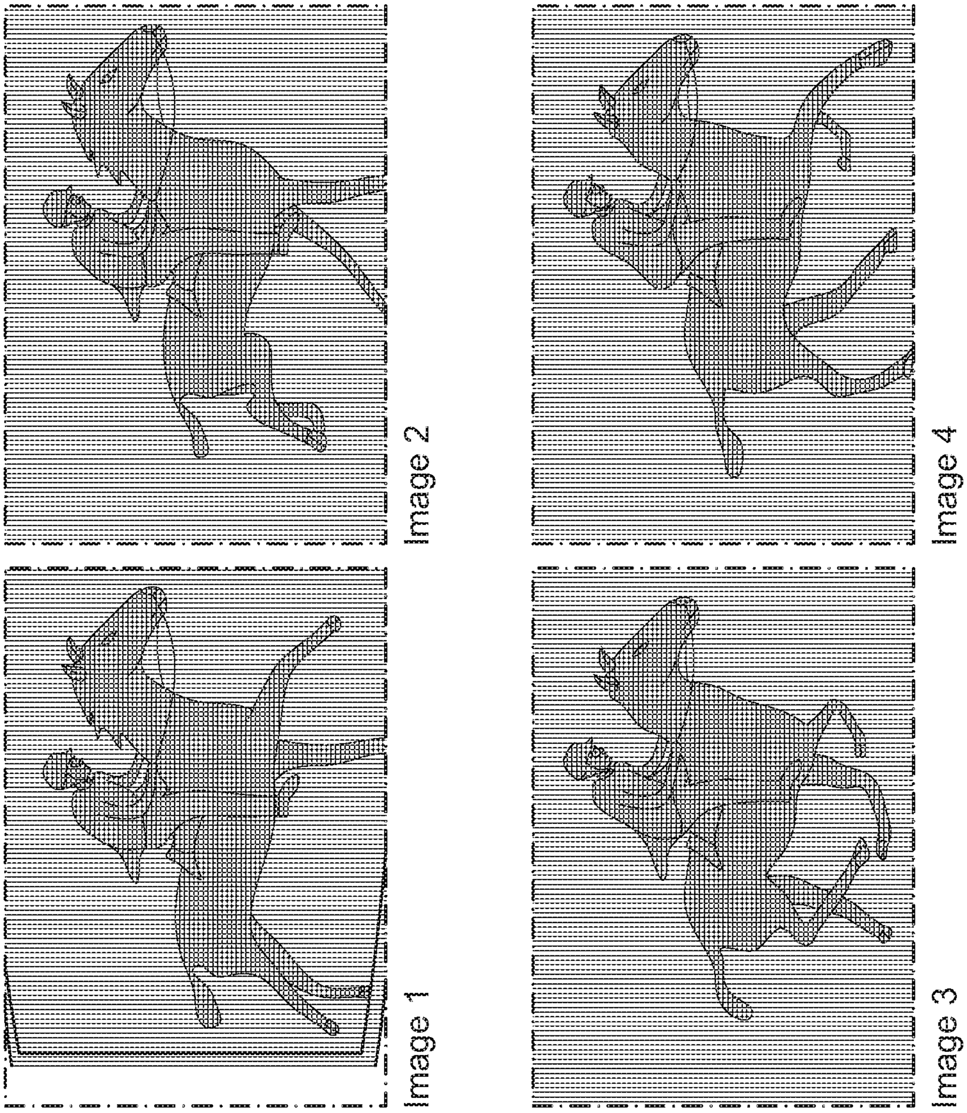
FIG. 3 shows the four images of FIG. 1.

The structure 10 comprises a lower perforated screen 12 configured to provide the plurality of images. FIG. 3 shows the images (image 1, Image 2, Image 3, Image 4) when viewed alone. Image 1, when viewed alone is a horse rider on a galloping horse. Image 2, when viewed alone is a horse rider on a galloping horse where at least the horse's legs and the rider have moved relative to image 1. Image 3, when viewed alone is a horse rider on a galloping horse where at least the horse's legs and the rider have moved relative to images 1 and 2. Image 4, when viewed alone is a horse rider on a galloping horse where at least the horse's legs and the rider have moved relative to images 1, 2 and 3. When viewed in succession images 1 to 4 provide the effect of a horse galloping. Furthermore, the effect is cyclic such that the transition from image 4 back to image 1 provides a continuation of the perceived animation and the horse and rider appear to be continually moving. This image is used as an example only, and it should be understood that any other series of images could be provided to achieve a similar animated effect.

Each image e.g. the galloping horse and rider is formed by a series of perforations 14 formed in a screen 12 which when viewed together give the overall effect of the image. As light travels through the perforations 14 for each image, the size of each perforation 14 permits passage of a relative amount of light. A small perforation 14 allows passage of less light (appears darker) than a relatively larger perforation 14 (appears lighter). Accordingly, the size of a perforation 14 in screen 12 can be used as a proxy for a pixel in each image.

Figure 2:
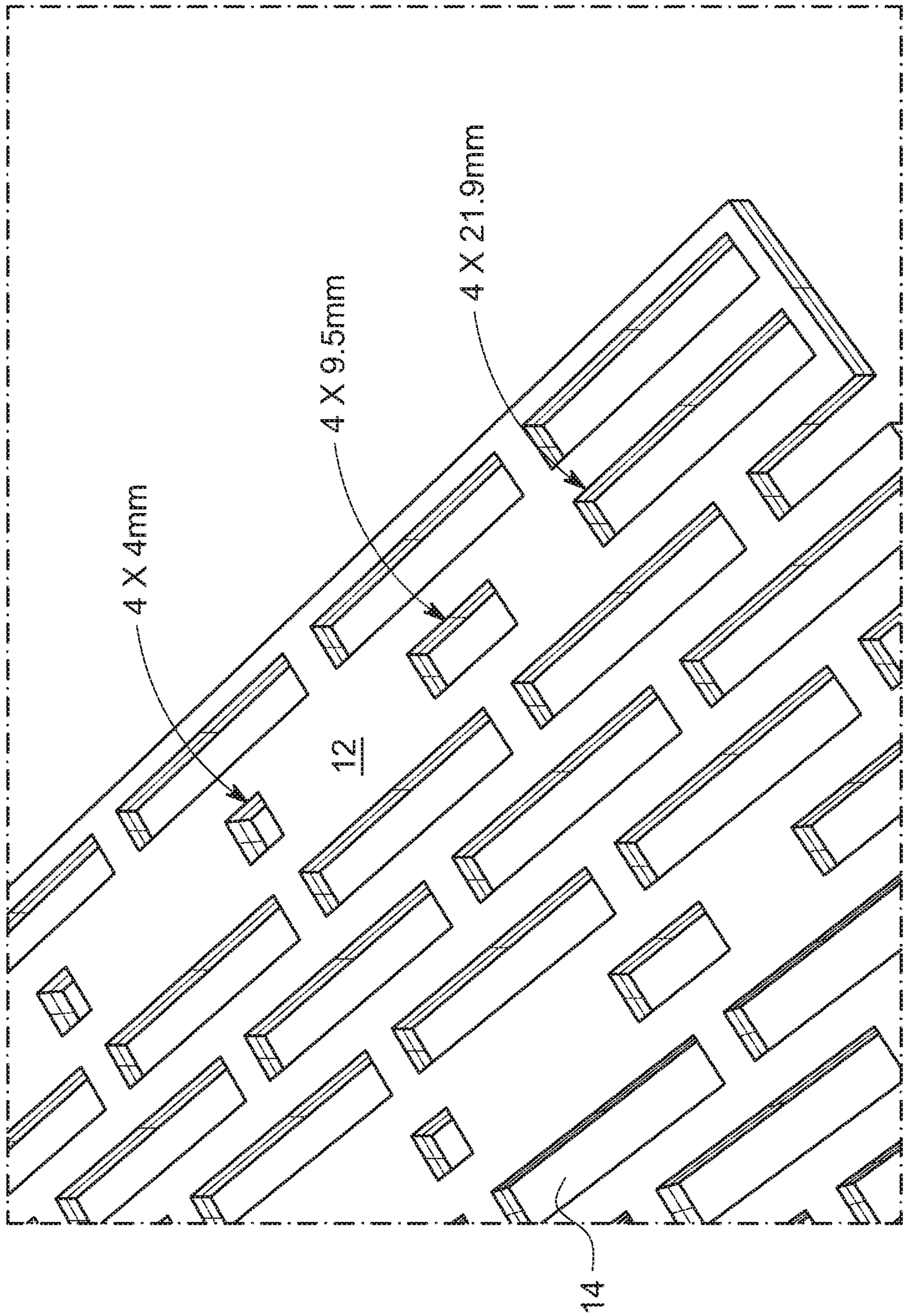
FIG. 2 is a close up of the lower perforated screen of FIG. 1.

In the horse and rider example, the perforations 14 are slotted perforations 14. The slotted perforations 14 comprise a series of single slots arranged in a line. As can be seen in FIG. 2, the length of each slotted perforation 14 can be varied to change the amount of light that can pass through (only one perforation is numbered for clarity). Each perforation 14 can have a fixed width of about 4 mm. Each perforation 14 can have a centre point which is the location midway along the slotted perforation when the perforation is at its longest length. An individual perforation 14 can be varied in length about that centre point. As shown in FIG. 2, a perforation is about 4 mm in length; another perforation is about 9.5 mm in length; a further perforation is about 21.9 mm in length (maximum). The perforation that is 4 mm×4 mm will allow passage of less light than the perforation that is 4 mm×9.5 mm. The perforation that is 4 mm×21.9 mm will allow more light through than the other depicted smaller perforations. The lands between each perforation also become a part of the overall image by means of the absence of light.

Figure 1A:
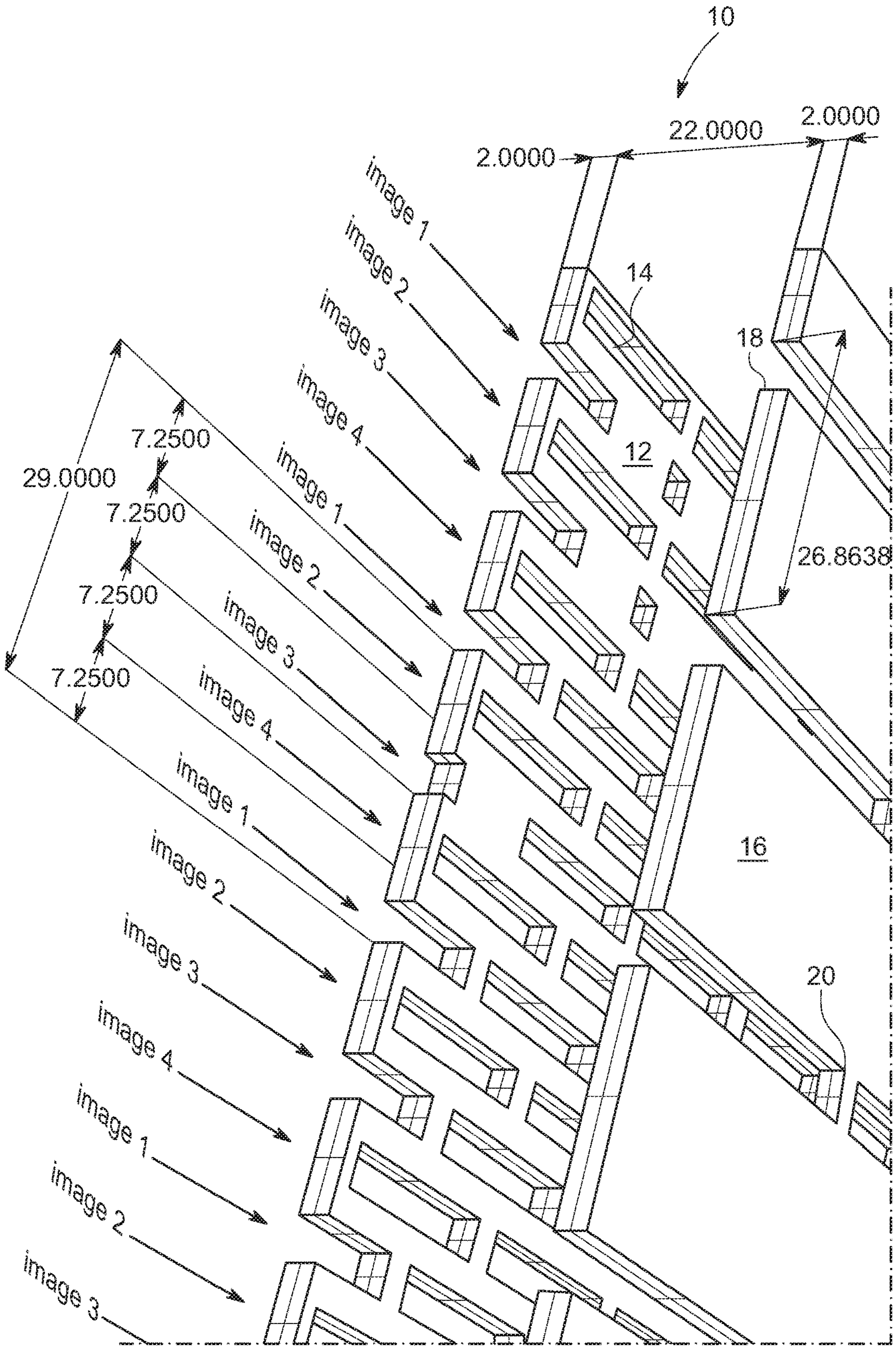
FIG. 1A and FIG. 1B are a perspective views of an embodiment of the lower perforated screen having four images and the upper defining screen. The dimensions shown are thickness of upper screen and lower screen 3.000 mm. Distance between lower surface of upper screen and upper surface of lower screen 22.0000 mm. Width image 2, 3, 4, 1 shown along lower edge 7.250 mm. Width of all four images 29.000 mm.
Figure 1B:
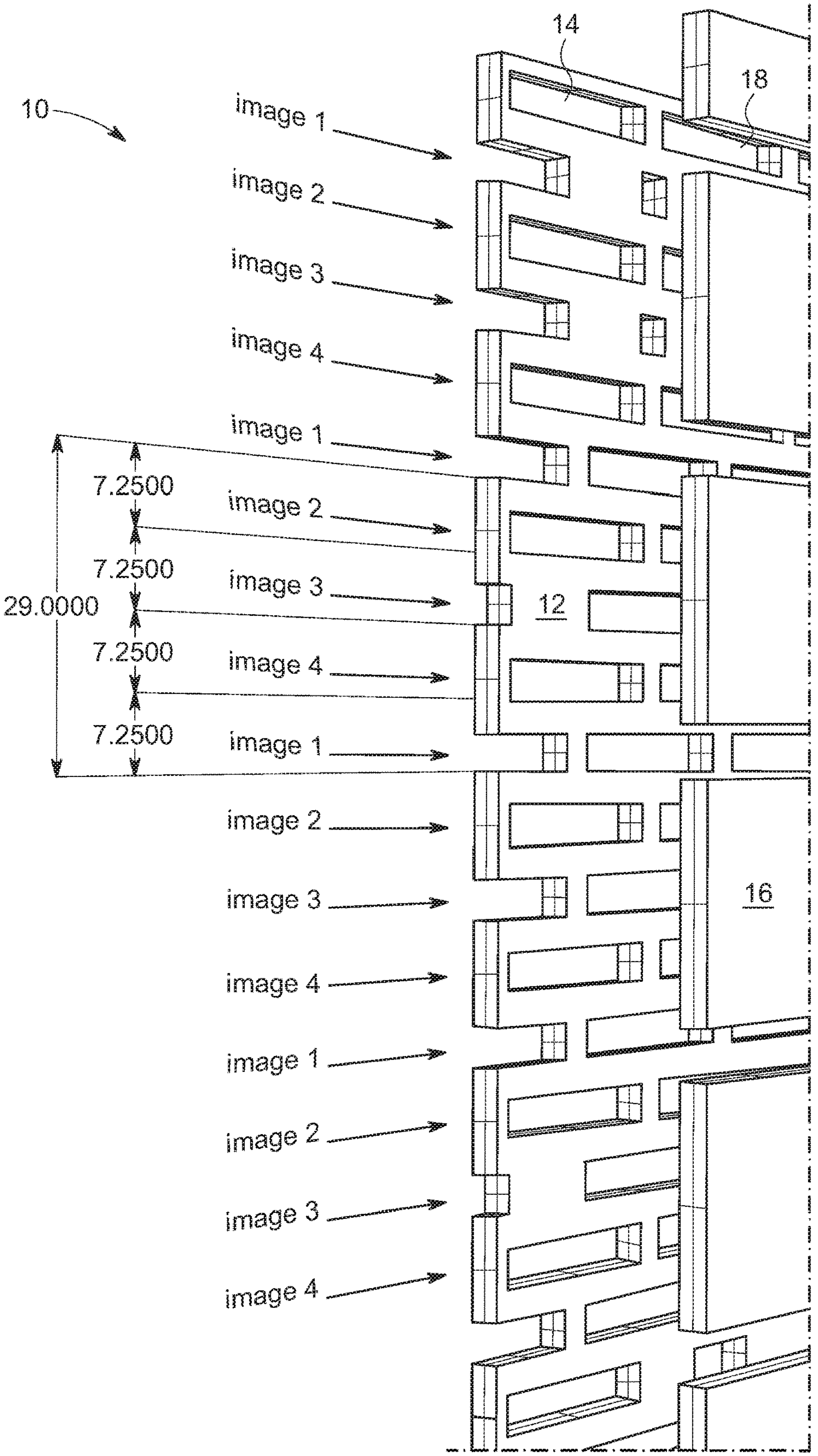
Figure 5A:
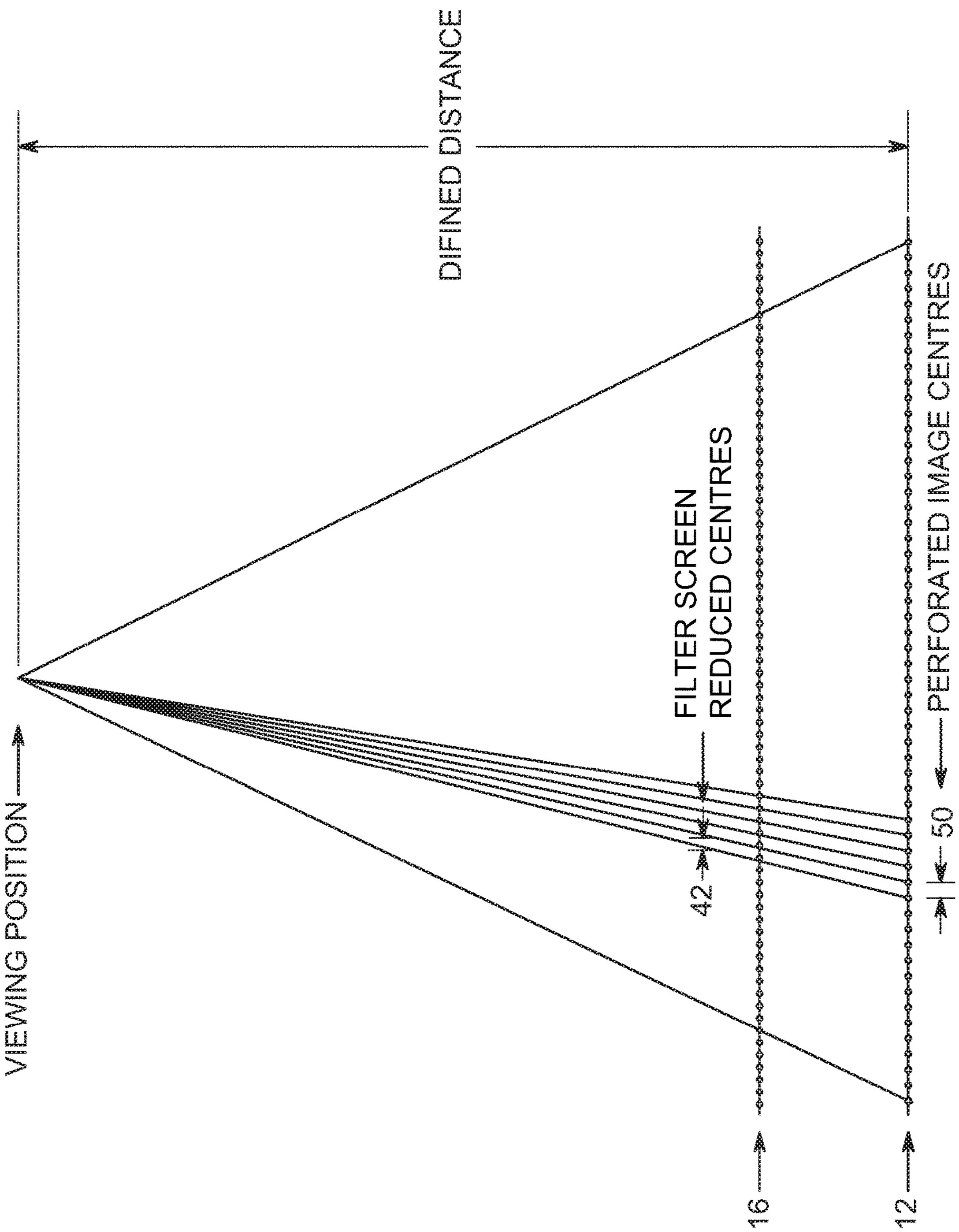
FIGS. 5A and 5B show viewing locations for viewing the images.
Figure 5B:
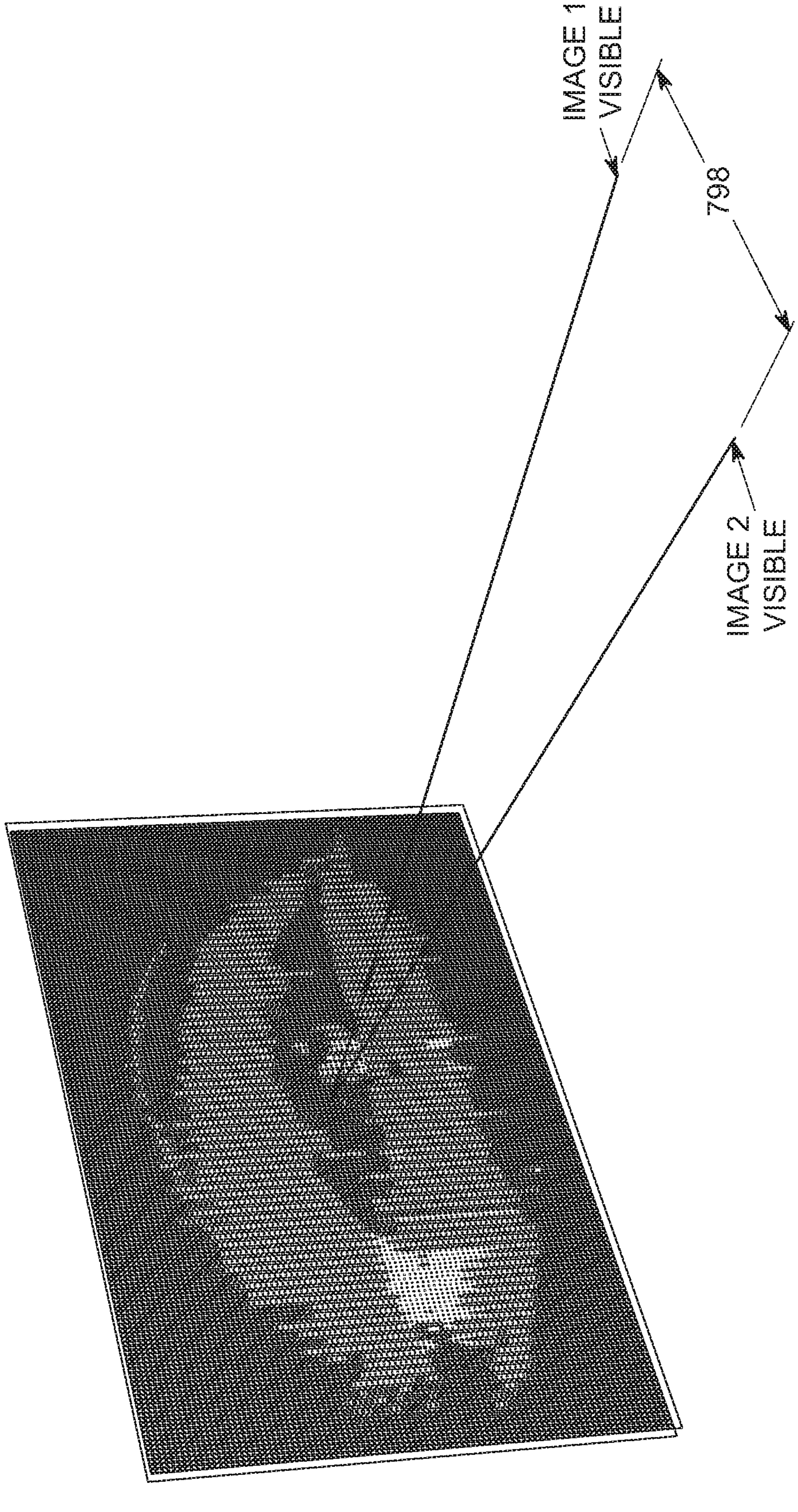

As shown in FIG. 1A and FIG. 1B, the image lines of each image are arranged across the lower perforated screen in an alternating pattern. The image 1 lines (A), image 2 lines (B), image 3 lines (C) and image 4 lines (D), are arranged in an alternating repeating pattern: A, B, C, D, A, B, C, D, A, B, C, D . . . . Each image has effectively been sliced and interleaved with the other images in a series of lines. The width of each image line is shown as 7.2 mm as measured by the distance of the outer edge of one slotted perforation 14 in a first image line to the distance of the outer edge of another slotted perforation 14 in the second image line. The spacing from the boundary edge of image 1 back to the boundary edge of the next image 1 is 29 mm. As can be seen in FIG. 1A, the upper defining screen aperture centres are slightly reduced centres compared to the distance between one row of image perforations to the next row for the same image. The reduction is a result of the distance between the image and defining screens and the viewing distance. The centres for the lower perforated screen do not change in relation to the distance between the lower perforated screen and the upper defining screen. The centres for the upper defining screen centres will reduce as the distance between the two screens increases. The spacing for the defining screen is calculated by (number of images)×(distance from one image to the next)×(a factor calculated by the distance viewed and the distance between the two screens. FIG. 5A shows the centre distances for two exemplary screens (42 (filter screen reduced centres) and 50 (perforated image centres). These spacings allow the whole of each image to be viewable simultaneously. In FIG. 5B, the viewer has to move about 798 mm in order to change from one image to the next (in this example).

Figure 4A:
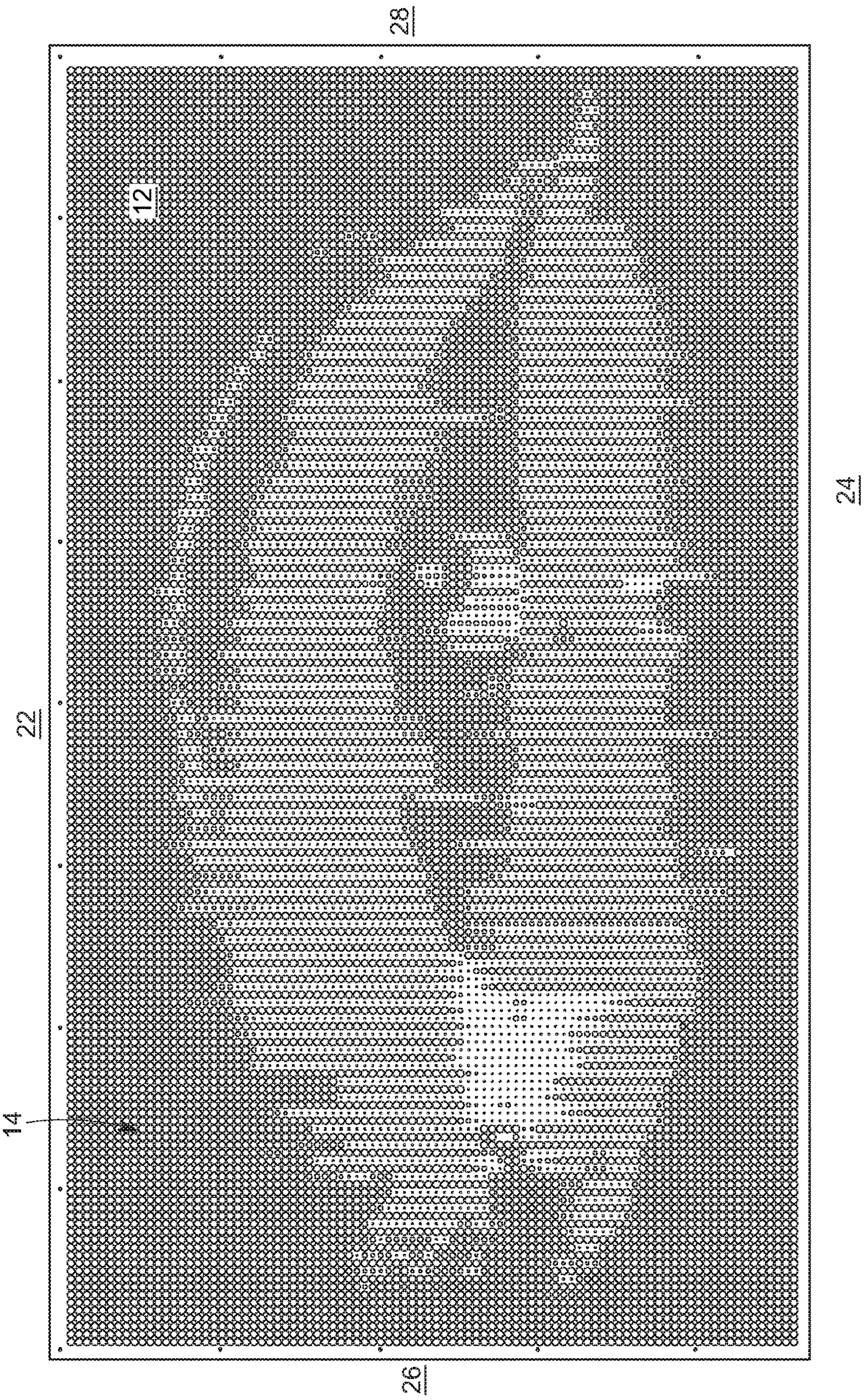
FIG. 4A is a lower perforated screen with two images.
Figure 4B:
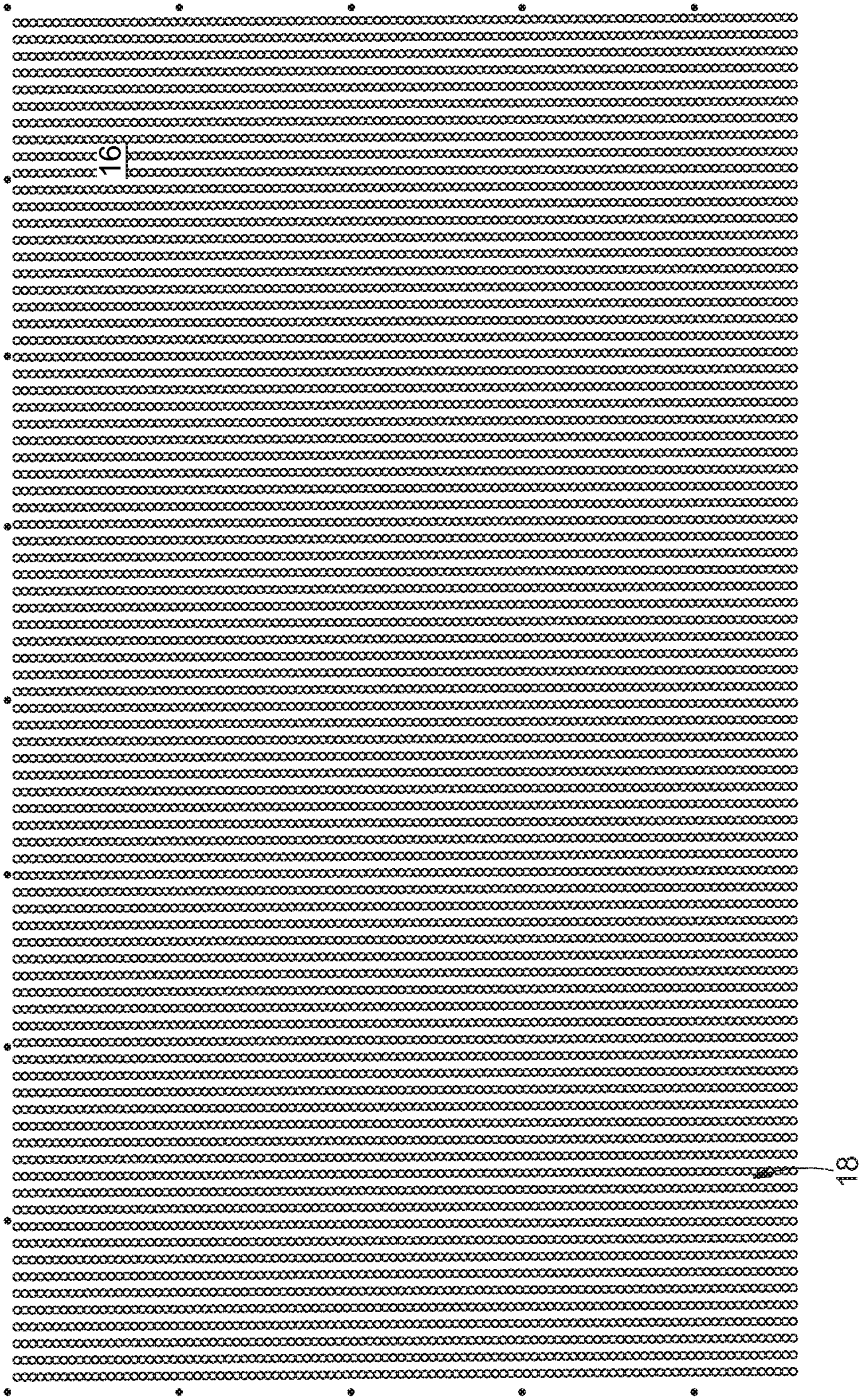
FIG. 4B is an upper defining screen for use with the lower perforated screen of FIG. 4A.
Figure 4C:
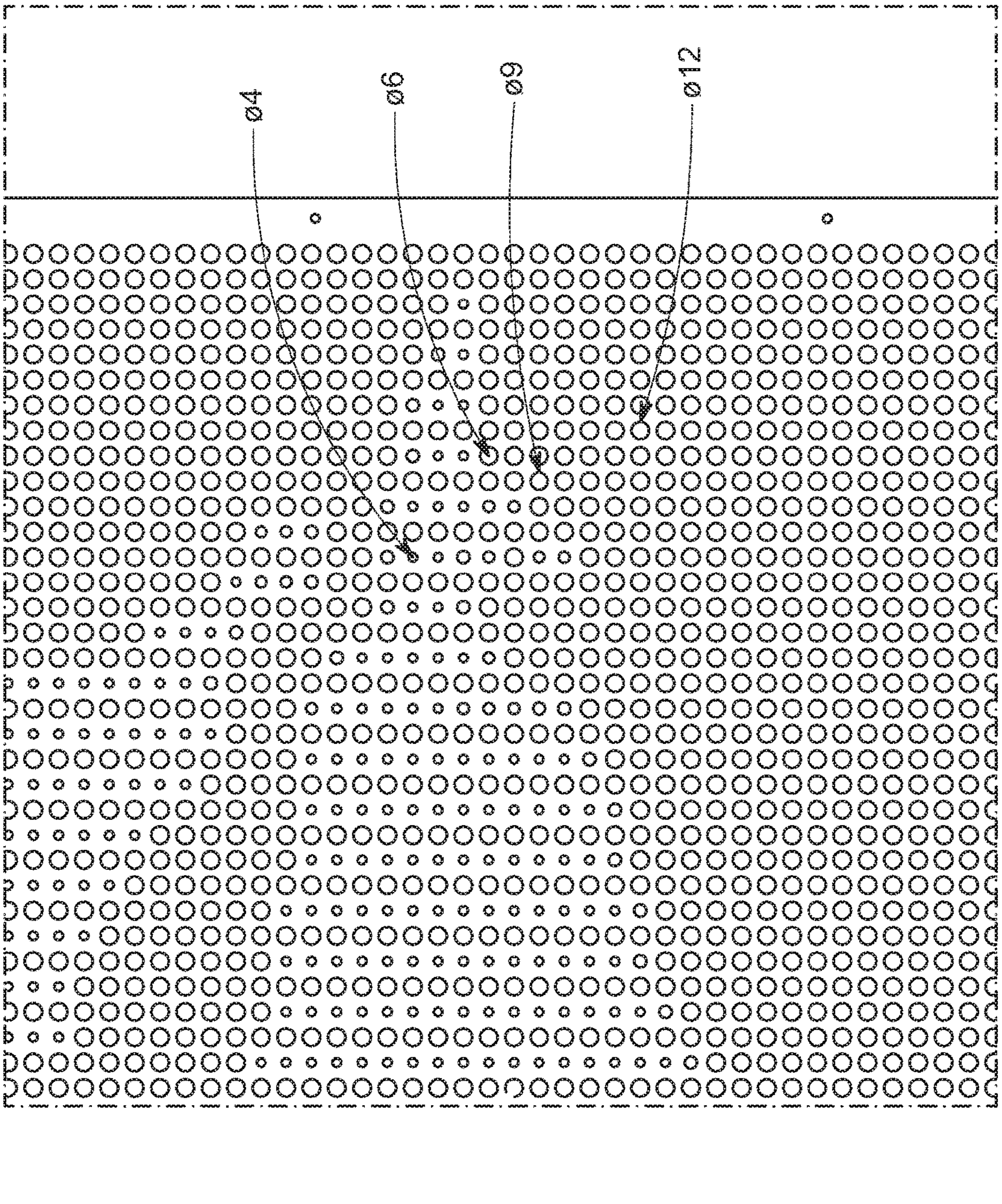
FIG. 4C is a close up of the lower perforated screen of FIG. 4A.

FIG. 4A shows an embodiment in which there are two images (first image and second image) and the perforations 14 are circular. The lower perforated plate 12 has each of the first and second images arranged in an alternating pattern. The first image is an open eye. The second image (interleaved with the first image) is a closed eye. The lower perforated screen can have a top edge 22, a bottom edge 24, a left-side edge 26 and a right-side edge 28. In FIG. 4A, the image lines are arranged from the left side edge to the right side edge. FIG. 4C is a close up of the lower perforated plate 12 showing the differently sized apertures 4 mm, 6 mm, 9 mm, 12 mm, to provide different amount of light therethrough, that are arranged to provide the overall visual effect seen in FIG. 4A.

In order to get the animated effect from the multiple images in e.g. FIGS. 1A & 1B or from FIGS. 4A & 4C, an upper defining screen 16 is required. The upper defining screen 16 allows the observer is to see only one of the images while the other images are occluded from view. Essentially, the upper defining screen 16 defines which perforations 14 (pixels) of the lower perforated screen 12 are visible to the observer.

The upper defining screen 16 allows passage of light in strips or lines that correspond or complement the image lines. To do this, the upper defining screen 16 has a series of occluding plates or closed areas that do not allow passage of light. Between each closed light-blocking area there are a series of defining apertures 18 arranged from one side to another side. The apertures 18, rather than being pixel forming like the perforations, are viewing apertures 18 which comprise open space to allow light from the perforations 14 to pass through mostly unhindered into the observer's eye. As can be seen in FIG. 1A each defining aperture 18 (there are 4 shown but only one labelled) can have a land or web 20 for structural stability. In FIG. 4B, each of the defining apertures is actually a series of large round shaped circular apertures in columns or lines that permit the passage of light.

The upper defining screen 16 is arranged substantially co-planarly over the lower perforated screen 12 and is spaced therefrom. Each screen can be about 3 mm in thickness. The spacing between the upper defining screen 16 and the lower perforated screen 12 can be by about 22 mm.

The distance of the upper defining screen from the lower perforated screen will change what the observer is able to see. FIGS. 5A and 5B show that once the structure 10 is place, the first image is viewable from a first viewing location (image 1 visible) and the second image is viewable from a second viewing location (image 2 visible). As the observer moves, the image changes between the first image and second image and in the case of the eye image of FIG. 4, the eye will appear to blink. The image e.g. blinking eye will change repeatably because of the cycling through first and second viewing locations as the observer moves relative to the structure 10. Thus, the plurality of images provides the illusion to the observer that the eye is animated because the images change.

It will of course be realized that while the foregoing has been given by way of illustrative example of this invention, all such and other modifications and variations thereto as would be apparent to persons skilled in the art are deemed to fall within the broad scope and ambit of this invention as is herein set forth.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Any promises made in the present description should be understood to relate to some embodiments of the invention and are not intended to be promises made about the invention as a whole. Where there are promises that are deemed to apply to all embodiments of the invention, the applicant/patentee reserves the right to later delete them from the description and does not rely on these promises for the acceptance or subsequent grant of a patent in any country.

The invention claimed is:

1. A structure for depicting a plurality of images, the structure comprising:

a lower perforated screen comprising the plurality of images, the plurality of images comprising at least a first image and a second image, wherein:

the first image is formed from first perforations arranged in a series of first image lines, the first perforations in each first image line allowing passage of an amount of light that represents an individual pixel or group of pixels of the first image so that the overall effect when viewing only the first image lines is formation of the first image, the second image is formed from second perforations arranged in a series of second image lines, the second perforations in each second image line allowing passage of an amount of light that represents an individual pixel or group of pixels of the second image so that the overall effect when viewing only the second image lines is formation of the second image, the first image lines and second image lines arranged across the lower perforated screen from one side to another side in an alternating pattern, an upper defining screen arranged substantially co-planarly over the lower perforated screen and spaced therefrom, the upper defining screen comprising a series of defining apertures arranged across the upper defining screen from one side to another side, wherein the width of each defining aperture in the upper defining screen is about the width of the first image lines and the second image lines so that from any one viewing perspective the first image or the second image can be isolated for viewing, and the first image is viewable from a first viewing location and the second image is viewable from a second viewing location so that repeated movement of an observer between the first viewing location and the second viewing location allows the plurality of images to appear to the user to be animated.

2. The structure according to claim 1, further comprising third image lines and fourth image lines, and the first image lines, second image lines, third image lines and fourth image lines alternate with one another in a pattern across the lower perforated screen from one side to another side.

3. The structure according to claim 1, wherein there are N image lines, where N is an even number.

4. The structure according to claim 1, wherein the first image and/or second image is formed from slotted perforations arranged in a series, wherein a length of each slot is adjusted to change the amount of light that can pass through the slot to change the pixel.

5. The structure according to claim 1, wherein the width of the slotted perforation is at least about 4 mm and the length is variable.

6. The structure according to claim 1, wherein the first image and/or second image is formed from circular perforations arranged in a series, wherein a diameter of each circle is adjusted to change the amount of light that can pass through the perforation to change the pixel.

7. The structure according to claim 1, wherein the lower perforated screen has a top edge, a bottom edge, a left edge and a right edge, and the first image lines and second image lines alternate with one another across the lower perforated screen from the left side to the right side.

8. The structure according to claim 1, wherein the upper defining screen is spaced from the lower perforated screen by at least about 1, 2, or 3 mm.

9. The structure according to claim 1, wherein the defining apertures have webs along their elongate lengths.

10. The structure according to claim 1, wherein the width of the defining apertures is about N mm.

11. The structure according to claim 1, wherein the structure is backlit.

* * * * *